United States Patent
Ahn

(10) Patent No.: US 10,833,555 B2
(45) Date of Patent: Nov. 10, 2020

(54) MOTOR FOR REDUCING A REPULSIVE FORCE

(71) Applicant: FOUNDATION OF SOONGSIL UNIVERSITY INDUSTRY COOPERATION, Seoul (KR)

(72) Inventor: Hyeong Joon Ahn, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 184 days.

(21) Appl. No.: 15/361,257

(22) Filed: Nov. 25, 2016

(65) Prior Publication Data

US 2017/0155303 A1 Jun. 1, 2017

(30) Foreign Application Priority Data

Nov. 27, 2015 (KR) .................. 10-2015-0167408
Jan. 26, 2016 (KR) .................. 10-2016-0009350
Jan. 26, 2016 (KR) .................. 10-2016-0009363
Jan. 26, 2016 (KR) .................. 10-2016-0009388

(51) Int. Cl.
| | |
|---|---|
| *H02K 5/24* | (2006.01) |
| *H02K 7/12* | (2006.01) |
| *H02K 5/15* | (2006.01) |
| *H02K 5/04* | (2006.01) |

(52) U.S. Cl.
CPC .............. *H02K 5/24* (2013.01); *H02K 5/04* (2013.01); *H02K 5/15* (2013.01); *H02K 7/125* (2013.01)

(58) Field of Classification Search
CPC ............ H02K 5/24; H02K 7/125; H02K 5/04; H02K 5/15

USPC ................... 310/419, 425, 426, 51
See application file for complete search history.

(56) References Cited

U.S. PATENT DOCUMENTS

| | | | | |
|---|---|---|---|---|
| 6,373,014 B1* | 4/2002 | Mitsuhashi | ............ | H01H 33/98 218/22 |
| 2005/0046302 A1* | 3/2005 | Suzuki | ............ | H02K 5/225 310/239 |
| 2012/0068472 A1* | 3/2012 | Wadehn | ............ | H02K 16/005 290/1 C |
| 2013/0057107 A1* | 3/2013 | Stretz | ............ | H02K 21/16 310/214 |

(Continued)

FOREIGN PATENT DOCUMENTS

| | | |
|---|---|---|
| JP | 2000-78809 A | 3/2000 |
| JP | 2002-112507 A | 4/2002 |

(Continued)

OTHER PUBLICATIONS

WJ Jeon et al., Rotary-Linear Induction Motor Composed of Four Primaries with Independently Energized Ring-Windings, Oct. 1997, All pages are pertinent.*

(Continued)

*Primary Examiner* — Emily P Pham
*Assistant Examiner* — Demetries A Gibson
(74) *Attorney, Agent, or Firm* — Hauptman Ham, LLP

(57) ABSTRACT

A rotary motor capable of reducing repulsive force is disclosed. The rotary motor comprises a housing, a stator located in the housing and configured to have a shape of a cylinder on which a central part is penetrated, and a rotator configured to rotate in the stator. Here, the stator rotates clockwise or counterclockwise.

5 Claims, 4 Drawing Sheets

(56) References Cited

U.S. PATENT DOCUMENTS

| | | | | |
|---|---|---|---|---|
| 2015/0033804 A1* | 2/2015 | Fukui | ............... | D06F 37/22 |
| | | | | 68/140 |
| 2016/0076986 A1* | 3/2016 | Belitsch | ............ | G01N 11/14 |
| | | | | 73/54.31 |
| 2016/0251794 A1* | 9/2016 | Kim | ............... | D06F 37/304 |
| | | | | 8/137 |
| 2017/0279334 A1* | 9/2017 | Nicoloff | ............ | F16M 13/02 |
| 2018/0183288 A1* | 6/2018 | Brahmavar | ............ | H02K 21/16 |
| 2019/0136858 A1* | 5/2019 | Walton | ............ | F04C 29/0007 |

FOREIGN PATENT DOCUMENTS

| | | |
|---|---|---|
| JP | 2011-193629 A | 9/2011 |
| JP | 2012-165570 A | 8/2012 |
| KR | 10-2012-0094771 A | 8/2012 |
| KR | 10-1397060 B1 | 5/2014 |

OTHER PUBLICATIONS

Korean Office Action dated Feb. 21, 2017 from KIPO in connection with the counterpart Korean Patent Application No. 10-2016-0009388.

Korean Office Action dated Feb. 21, 2017 from KIPO in connection with the counterpart Korean Patent Application No. 10-2016-0009363.

Korean Office Action dated Feb. 21, 2017 from KIPO in connection with the counterpart Korean Patent Application No. 10-2016-0009350.

* cited by examiner

MOTOR FOR REDUCING A REPULSIVE FORCE

CROSS REFERENCE TO RELATED APPLICATION

This application is based upon and claims the benefit of priority from Korean Patent Application No. 10-2015-0167408, filed on Nov. 27, 2015 and Korean Application Nos. 10-2016-0009350, 10-2016-0009363, and 10-2016-0009388, filed on Jan. 6, 2016 in the Korean Intellectual Property Office, the entire contents of which are incorporated herein by reference.

TECHNICAL FIELD

The present disclosure relates to a rotary motor capable of reducing a repulsive force.

BACKGROUND ART

FIG. 1 is a section view illustrating a conventional induction motor.

In FIG. 1, the conventional induction motor 100 includes a housing 110, a stator 120, a rotator 130 and a rotator bearing 140.

The housing 110 protects internal elements of the induction motor 100, and is mounted on a base 150.

The stator 120 and the rotator 130 locate in the housing 120, and the rotator 130 rotates in a direction of an axis in the stator 120. Here, the rotator bearing 140 rotates a rotation axis of the rotator 130. The stator 120 is fixed and does not move.

However, in the conventional induction motor 100, a repulsive torque acts on the stator 120 and is delivered to the base 150 if a velocity of the rotator 130 changes according as a torque acts on the induction motor 100. As a result, it brings about vibration of the base 150.

SUMMARY

Accordingly, the invention is provided to substantially obviate one or more problems due to limitations and disadvantages of the related art. One embodiment of the invention provides a rotary motor capable of reducing a repulsive force delivered to a base.

Other features of the invention may be thought by a person in an art through following embodiments.

One embodiment of the invention provides a rotary induction motor that includes a housing; a stator located in the housing and configured to have a shape of a cylinder on which a central part is penetrated; and a rotator configured to rotate in the stator. Here, the stator rotates clockwise or counterclockwise.

The stator may rotate in a direction opposed to a rotation direction of the rotator.

The rotary induction motor further comprises a stator bearing connected to the housing and configured to rotate a rotation axis of the stator.

The rotary induction motor further comprises a base configured to support the housing; and at least one displacement limitation member configured to connect the housing to the base.

The rotary induction motor further comprises a rotation sensor adhered to an internal side of the housing and configured to sense rotation amount of the rotator.

Another embodiment of the present invention provides a rotary BLDC motor having a hall sensor that includes a housing; a stator located in the housing and configured to have a shape of a cylinder on which a central part is penetrated; and a rotator configured to rotate in the stator, wherein the stator rotates clockwise or counterclockwise Still another embodiment of the present invention provides a rotary AC servo motor having a hall sensor that includes a housing; a stator located in the housing and configured to have a shape of a cylinder on which a central part is penetrated; and a rotator configured to rotate in the stator, wherein the stator rotates clockwise or counterclockwise.

A rotary motor of the invention may reduce a repulsive force delivered to a base.

BRIEF DESCRIPTION OF DRAWINGS

Example embodiments of the present invention will become more apparent by describing in detail example embodiments of the present invention with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Hereinafter, various embodiment of the invention will be described in detail with reference to accompanying drawings.

Figure 1:
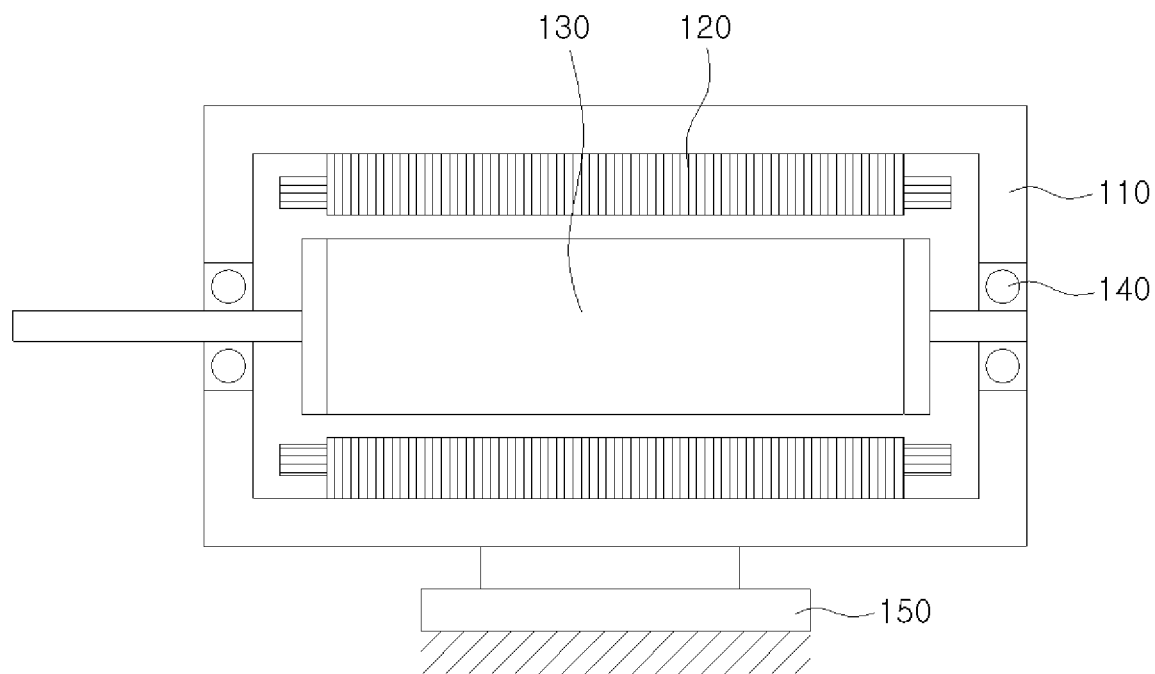
FIG. 1 is a section view illustrating a conventional induction motor.
Figure 2:
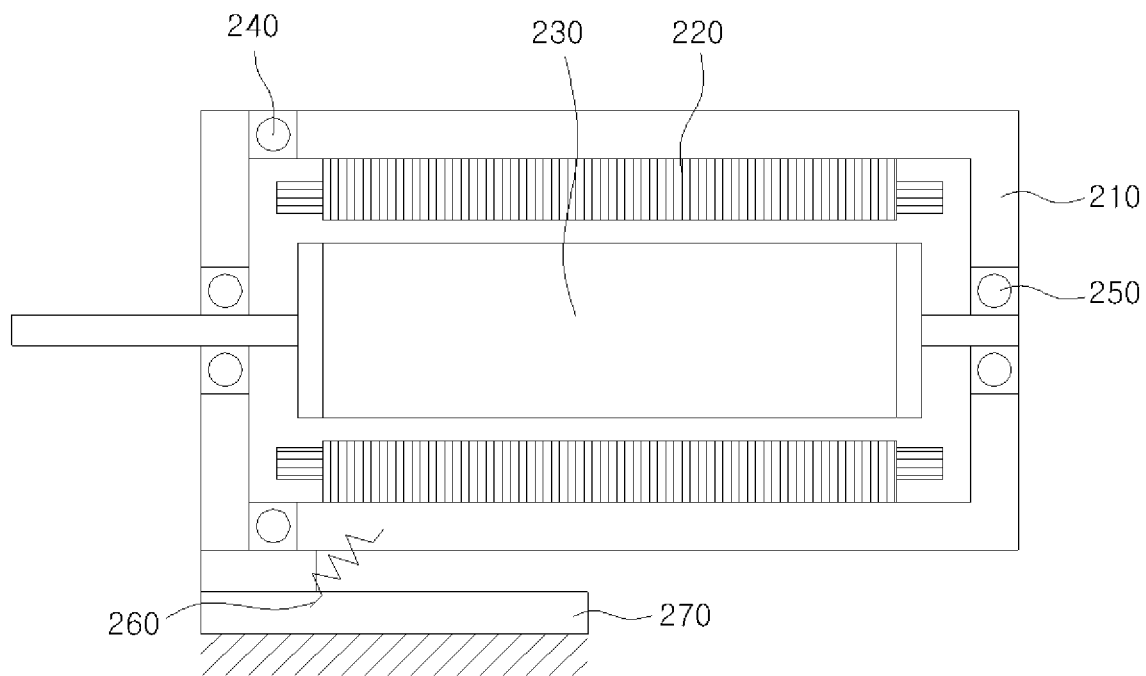
FIG. 2 is a sectional view illustrating a rotary motor according to a first embodiment of the invention.

FIG. 2 is a sectional view illustrating a rotary motor according to a first embodiment of the invention.

In FIG. 2, a rotary motor 200 according to a first embodiment of the invention is a rotary induction motor 200, and includes a housing 210, a stator 220, a rotator 230, a stator bearing 240, a rotator bearing 250, a displacement limitation member 260 and a base 270. Hereinafter, functions of the elements will be described in detail.

The housing 210 protects internal elements of the rotary induction motor 200, and is mounted on the base 270. That is, the base 270 supports the housing 210.

The stator 220 locates in the housing 210, and has a shape of a cylinder of which a central part is penetrated.

Here, the stator 220 may be a rotary stator which can rotate clockwise or counterclockwise. That is, the stator 220 may axis-rotate based on a direction of an axis of the cylinder. Here, the rotary induction motor 200 may detect changing of a magnetic flux or inductance through a current signal, and predict a rotation movement of the stator 220 according to the detected result.

The stator bearing 240 is connected to the housing 210, and rotates a rotation axis of the stator 220. For example, the stator bearing 240 may have a ring shape.

The rotator 230 locates in the housing 210, and rotates in a direction of an axis in the stator 220. Here, the rotator 230 may also rotate clockwise or counterclockwise. The rotator bearing 250 rotates a rotation axis of the rotator 230.

In one embodiment, the stator 220 may rotate in a direction opposed to a rotation direction of the rotator 230.

The displacement limitation member 260 connects the housing 210 to the base 270 One or more displacement limitation members 260 exist. Here, the displacement limitation member 260 may be formed by various materials such as a torsion spring in proportional to a rotation displacement, a spring in proportion to displacement, a damper in proportion to velocity, or elastic material, etc.

Hereinafter, effect of the rotary induction motor 200 according to the first embodiment of the invention will be described with reference to drawing FIG. 3.

A repulsive torque acts on the stator 220 when the rotator 230 rotates according to a torque T, the repulsive torque having the same amplitude as the torque T and a direction of the repulsive torque being opposed to that of the torque T. In case of the rotary induction motor 200, the stator 220 rotates by a certain angle based on the housing 210 due to the repulsive torque in accordance with the rotation of the rotator 230. Accordingly, the remaining vibration of the base 270 occurred by the repulsive torque in accordance with the rotation of the stator 220 may considerably reduce. Additionally, a repulsive force delivered to the base 270 may decrease, and a cost needed for increasing hardness of the base 270 may reduce.

The rotary induction motor 200 of the first embodiment may decrease more the vibration delivered to the base 270 through the displacement limitation member 260.

Figure 3:
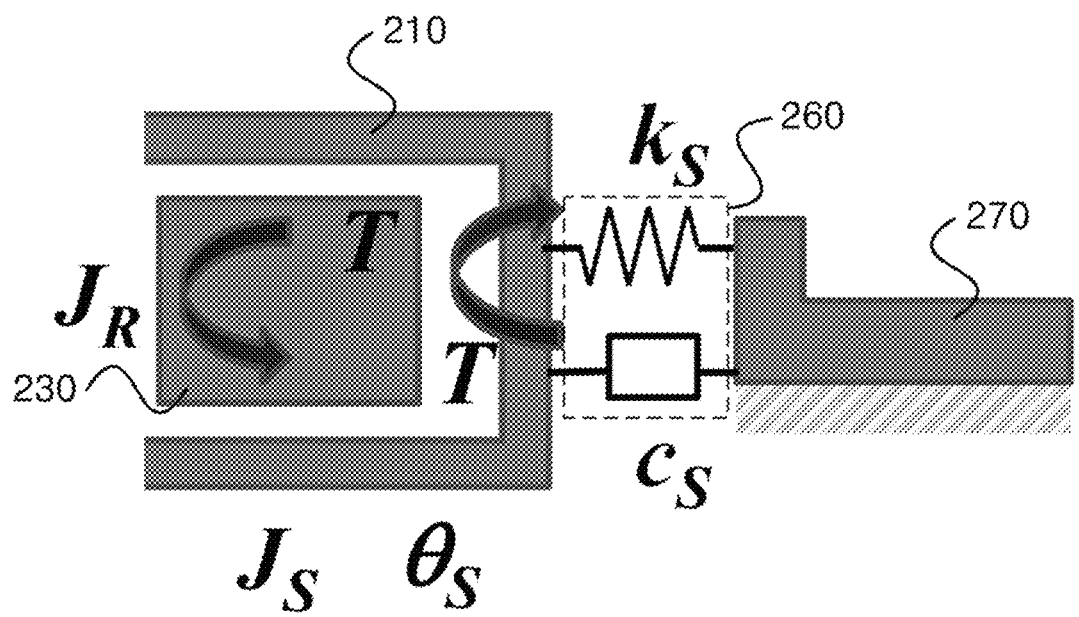
FIG. 3 is a view illustrating effect of the rotary motor according to a first embodiment of the invention.

Particularly, a movement equation of the stator 220 may be expressed by equation 1 when the displacement limitation member 260 includes a spring and a damper as shown in FIG. 3.

$$J_s\ddot{\theta}_s + c_s\dot{\theta}_s + k_s\theta_s = T \quad \text{[Equation 1]}$$

Here, the repulsive torque is dispersed as inertial energy, and only torque of the displacement limitation member 260 is delivered to the base 270. This may be expressed by equation 2.

$$T_{tran} = c_s\dot{\theta}_s + k_s\theta_s \quad \text{[Equation 2]}$$

Accordingly, only torque smaller than the repulsive torque is delivered to the base 270 according as the rotary induction motor 200 further includes the displacement limitation member 260. As a result, the vibration of the base 270 may be more reduced.

On the other hand, electric wiring of the rotary motor 200 may replace the function of the displacement limitation member 260. In this case, extra displacement limitation member 260 may not exist.

Figure 4:
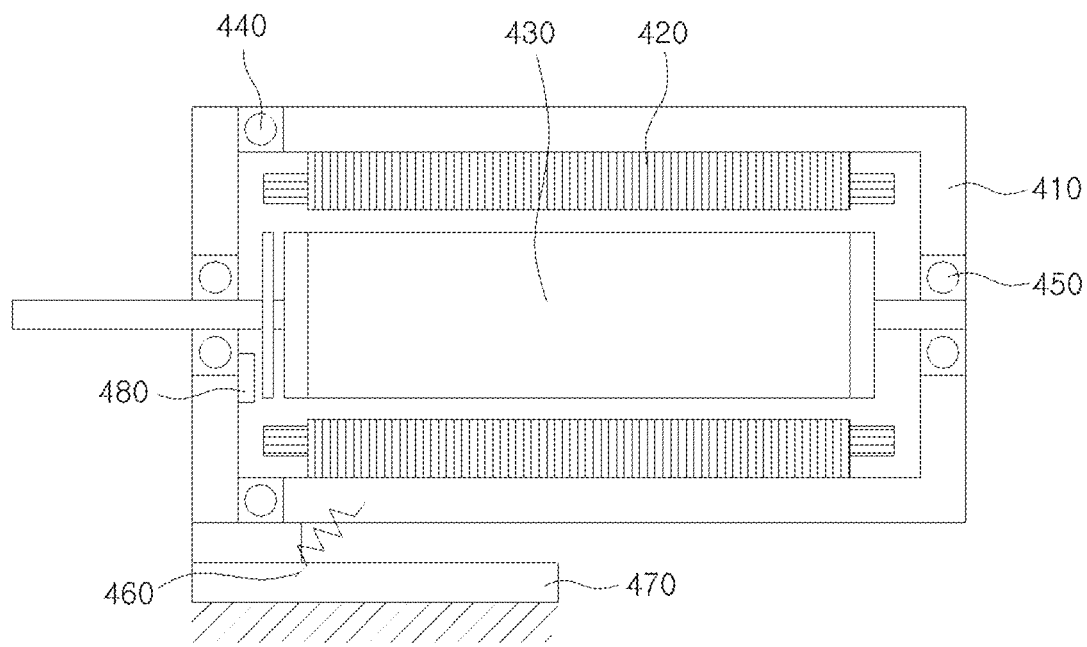
FIG. 4 is a sectional view illustrating a side of a rotary motor according to a second embodiment of the invention.

FIG. 4 is a sectional view illustrating a side of a rotary motor according to a second embodiment of the invention.

In FIG. 4, a rotary motor 400 according to a second embodiment of the invention is a rotary induction motor 400, and includes a housing 410, a stator 420, a rotator 430, a stator bearing 440, a rotator bearing 450, a displacement limitation member 460, a rotation sensor 470 and a base 480.

That is, the rotary motor 400 of the second embodiment further includes the rotation sensor 470 compared to the rotary motor 200 of the first embodiment, and the other elements of the rotary motor 400 are the same as in the rotary motor 200.

The rotary sensor 470 is adhered to an internal side of the housing 410, and measure rotation amount of the rotator 430 by sensing velocity or rotational displacement of the rotator 430. For example, an encoder may be used as the rotation sensor 470, and may be disposed in front of the housing 410. The rotary induction motor 400 is controlled by controlling current of the stator 420 according to the sensed rotation amount of the rotator 430. For instance, repulsive force applied to the stator 420 may be calculated through a value sensed by the rotation sensor 470 and a power of the rotary induction motor 400 may be controlled depending on the calculated repulsive force.

Figure 5:
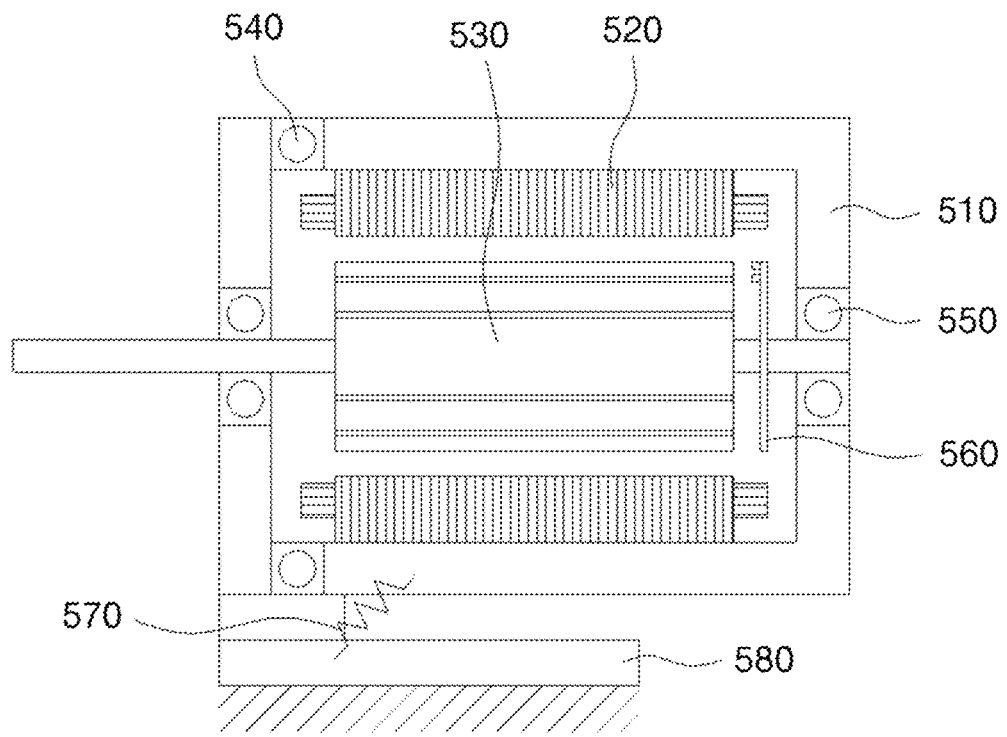
FIG. 5 is a sectional view illustrating a side of a rotary motor according to a third embodiment of the invention.

FIG. 5 is a sectional view illustrating a rotary motor according to a third embodiment of the invention.

In FIG. 5, a rotary motor 500 according to a third embodiment of the invention is a rotary BLDC induction motor 500, and includes a housing 510, a stator 520, a rotator 530, a stator bearing 540, a rotator bearing 550, a hall sensor 560, a displacement limitation member 570 and a base 580. Hereinafter, functions of the elements will be described in detail.

The housing 510 protects internal elements of the rotary BLDC motor 500. The stator 520 locates in the housing 510, and has a shape of a cylinder of which a central part is penetrated. The stator bearing 540 is connected to the housing 510, and rotates a rotation axis of the stator 520. The rotator 530 locates in the housing 510, and rotates in a direction of an axis in the stator 520. The rotator bearing 550 rotates a rotation axis of the rotator 530. The displacement limitation member 570 connects the housing 510 to the stator 530.

The hall sensor 560 is attached to the interior of the housing 510 (e.g., disposed at the rotational axis of the rotor 530) and measures the relative position of the rotor 530 relative to the stator 520. Thus, the electrical angle of the stator 520 can be adjusted. On the other hand, an encoder may be attached instead of the Hall sensor 560.

Figure 6:
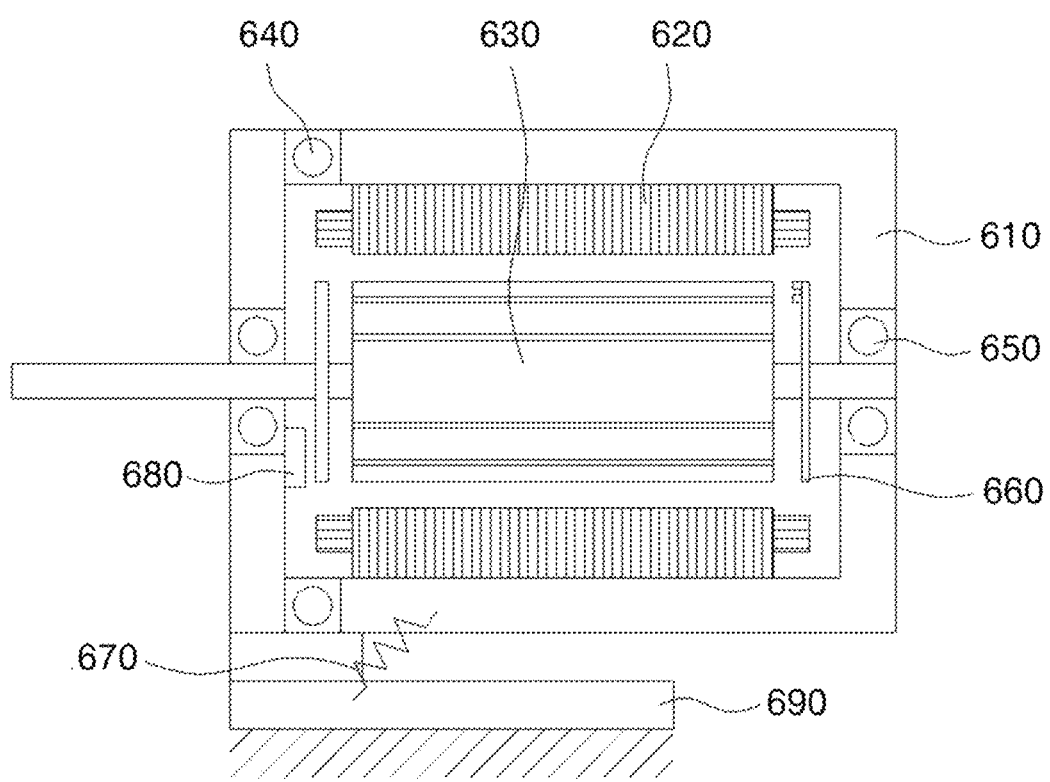
FIG. 6 is a sectional view illustrating a side of a rotary motor according to a fourth embodiment of the invention.

FIG. 6 is a sectional view illustrating a rotary motor according to a fourth embodiment of the invention.

In FIG. 6, a rotary motor 600 according to a third embodiment of the invention is a rotary BLDC induction motor 600, and includes a housing 610, a stator 620, a rotator 630, a stator bearing 640, a rotator bearing 650, a hall sensor 660, a displacement limitation member 670, a rotation sensor 670 and a base 680. Hereinafter, functions of the elements will be described in detail.

That is, the rotary motor 600 of the fourth embodiment further includes the rotation sensor 670 compared to the rotary motor 500 of the third embodiment, and the other elements of the rotary motor 600 are the same as in the rotary motor 500.

The rotary sensor 670 is adhered to an internal side of the housing 610, and measure rotation amount of the rotator 630 by sensing velocity or rotational displacement of the rotator 630. The rotary BLDC motor 600 is controlled by controlling current of the stator 620 according to the sensed rotation amount of the rotator 630.

Figure 7:
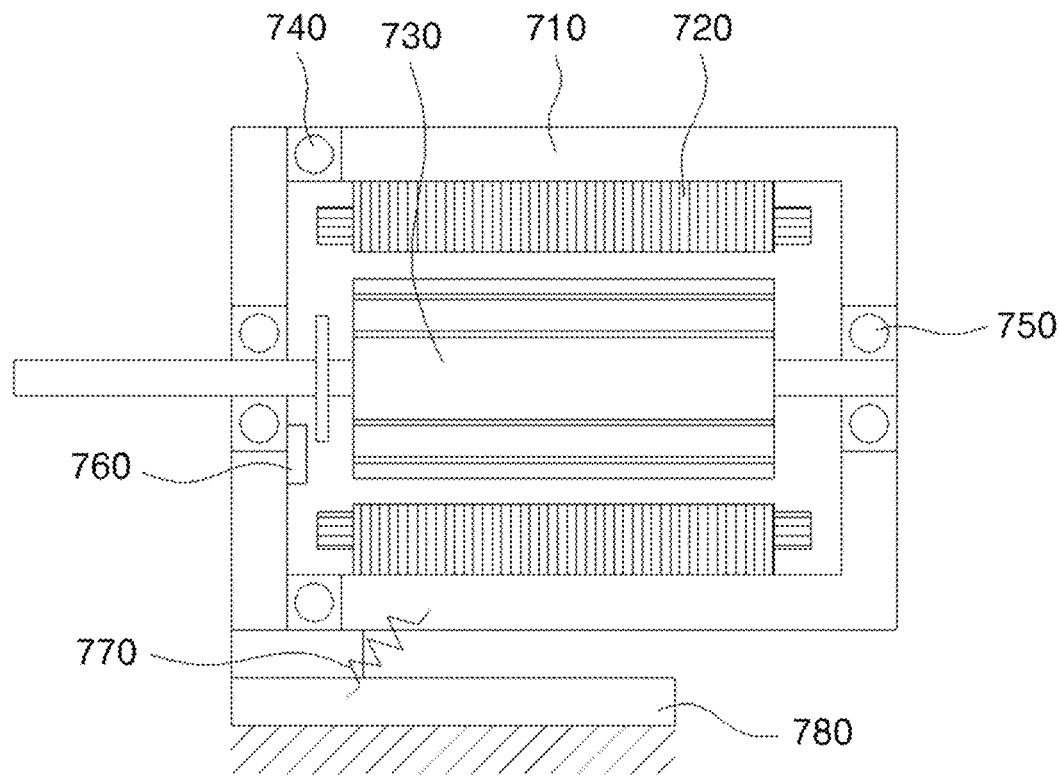
FIG. 7 is a sectional view illustrating a side of a rotary motor according to a fifth embodiment of the invention.

In FIG. 7, a rotary motor 700 according to a fifth embodiment of the invention is a rotary AC servo induction motor 700, and includes a housing 710, a stator 720, a rotator 730, a stator bearing 740, a rotator bearing 750, a rotation sensor 760, a displacement limitation member 770 and a base 780. Hereinafter, functions of the elements will be described in detail.

The housing 710 protects internal elements of the rotary AC servo motor 700. The stator 720 locates in the housing 710, and has a shape of a cylinder of which a central part is penetrated. The stator bearing 740 is connected to the housing 710, and rotates a rotation axis of the stator 720. The rotator 730 locates in the housing 710, and rotates in a direction of an axis in the stator 720. The rotator bearing 750 rotates a rotation axis of the rotator 730. The rotary sensor 760 is adhered to an internal side of the housing 710, and measure rotation amount of the rotator 730 by sensing velocity or rotational displacement of the rotator 730. The displacement limitation member 770 connects the housing 710 to the stator 730.

Figure 8:
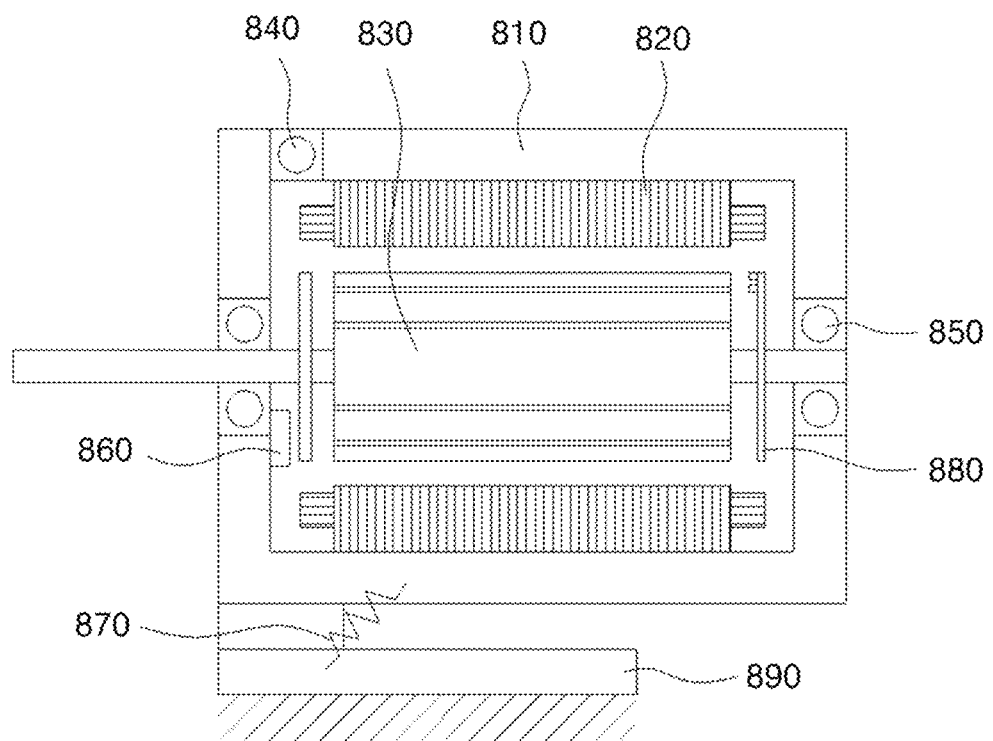
FIG. 8 is a sectional view illustrating a side of a rotary motor according to a sixth embodiment of the invention.

FIG. 8 is a sectional view illustrating a rotary motor according to a sixth embodiment of the invention.

In FIG. 8, a rotary motor 800 according to a third embodiment of the invention is a rotary AC servo induction motor 800, and includes a housing 810, a stator 820, a rotator 830, a stator bearing 840, a rotator bearing 850, a rotation sensor 860, a displacement limitation member 870, a hall sensor 880 and a base 890. Hereinafter, functions of the elements will be described in detail.

That is, the rotary motor 800 of the sixth embodiment further includes the hall sensor 880 compared to the rotary motor 700 of the fifth embodiment, and the other elements of the rotary motor 800 are the same as in the rotary motor 700.

The hall sensor 880 is attached to the interior of the housing 810 (e.g., disposed at the rotational axis of the rotor 830) and measures the relative position of the rotor 830 relative to the stator 820. Thus, the electrical angle of the stator 820 can be adjusted.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A rotary induction motor comprising:
a housing;
a stator located in the housing and having a shape of a cylinder on which a central part is penetrated;
a rotator located in the central part of the stator and configured to rotate based on a direction of an axis of the cylinder;
a base configured to support the housing; and
at least one displacement limitation member configured to connect the housing to the base, wherein the at least one displacement limitation member reduces vibrations transmitted to the base,
wherein the stator is configured to rotate in a direction opposed to a rotation direction of the rotator based on the direction of the axis of the cylinder,
wherein the at least one displacement limitation member includes a torsion spring and a damper, and
wherein the at least one displacement limitation member dissipates a repulsive torque generated by the rotation of the rotor, and only a torque of the at least one displacement limitation member smaller than the repulsive torque is transmitted to the base.

2. The rotary induction motor of claim 1, further comprising:
a stator bearing connected to the housing and configured to rotate a rotation axis of the stator.

3. The rotary induction motor of claim 1, further comprising:
a rotation sensor adhered to an internal side of the housing and configured to sense rotation amount of the rotator.

4. A rotary brushless direct current electric (BLDC) motor having a hall sensor, the rotary BLDC motor comprising:
a housing;
a stator located in the housing and having a shape of a cylinder on which a central part is penetrated;
a rotator located in the central part of the stator and configured to rotate based on a direction of an axis of the cylinder;
a base configured to support the housing; and
at least one displacement limitation member configured to connect the housing to the base, and the at least one displacement limitation member reduces vibrations transmitted to the base,
wherein the stator is configured to rotate in a direction opposed to a rotation direction of the rotator based on the direction of the axis of the cylinder,
wherein the at least one displacement limitation member includes a torsion spring and a damper, and
wherein the at least one displacement limitation member dissipates a repulsive torque generated by the rotation of the rotor, and only a torque of the at least one displacement limitation member smaller than the repulsive torque is transmitted to the base.

5. A rotary alternating current (AC) servo motor having a hall sensor, the rotary BLDC motor comprising:
a housing;
a stator located in the housing and having a shape of a cylinder on which a central part is penetrated;
a rotator located in the central part of the stator and configured to rotate based on a direction of an axis of the cylinder;
a base configured to support the housing; and
at least one displacement limitation member configured to connect the housing to the base, and the at least one displacement limitation member reduces vibrations transmitted to the base,
wherein the stator is configured to rotate in a direction opposed to a rotation direction of the rotator based on the direction of the axis of the cylinder,
wherein the at least one displacement limitation member is formed by includes a torsion spring and a damper, and
wherein the at least one displacement limitation member dissipates a repulsive torque generated by the rotation of the rotor, and only a torque of the at least one displacement limitation member smaller than the repulsive torque is transmitted to the base.

* * * * *